United States Patent
Kao et al.

(10) Patent No.: US 12,362,871 B2
(45) Date of Patent: Jul. 15, 2025

(54) PHYSICAL BROADCAST CHANNEL FOR CHANNEL CORRECTION

(71) Applicant: QUALCOMM Incorporated, San Diego, CA (US)

(72) Inventors: Yuhung Kao, San Diego, CA (US); Ravinder Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 17/932,065

(22) Filed: Sep. 14, 2022

(65) Prior Publication Data

US 2024/0089038 A1 Mar. 14, 2024

(51) Int. Cl.
*H04L 1/20* (2006.01)
*H04L 5/00* (2006.01)

(52) U.S. Cl.
CPC ............ *H04L 1/208* (2013.01); *H04L 5/0051* (2013.01)

(58) Field of Classification Search
CPC ..... H04L 1/208; H04L 5/0051; H04L 5/0048; H04L 1/0047; H04L 1/0072; H04L 25/0236; H04L 1/0052; H04B 17/21; H04B 17/309

See application file for complete search history.

(56) References Cited

U.S. PATENT DOCUMENTS

| | | | |
|---|---|---|---|
| 10,015,696 | B2 | 7/2018 | Liu et al. |
| 11,581,935 | B2 * | 2/2023 | He .................... H04B 7/0695 |
| 2015/0358975 | A1 | 12/2015 | Yang et al. |
| 2020/0374836 | A1 * | 11/2020 | Chen .................. H04W 56/001 |
| 2021/0136703 | A1 * | 5/2021 | Kundargi .............. H04W 72/23 |
| 2021/0390004 | A1 * | 12/2021 | Kundu .................... G06F 9/545 |
| 2022/0038206 | A1 | 2/2022 | Martinez et al. |

FOREIGN PATENT DOCUMENTS

WO    WO-2022154822 A1 * 7/2022

OTHER PUBLICATIONS

International Search Report and Written Opinion—PCT/US2023/072222—ISA/EPO—Dec. 6, 2023.

* cited by examiner

*Primary Examiner* — Justin T Van Roie
(74) *Attorney, Agent, or Firm* — Harrity & Harrity, LLP

(57) ABSTRACT

Various aspects of the present disclosure generally relate to wireless communication. In some aspects, a user equipment (UE) may receive a first physical broadcast channel (PBCH) communication on a channel. The UE may decode the first PBCH communication as a decoded PBCH payload. The UE may reencode the decoded PBCH payload as a first pilot signal. The UE may receive a first data communication with first data. The UE may correct the channel for the first data based on the first pilot signal. The UE may decode the first data. Numerous other aspects are described.

30 Claims, 10 Drawing Sheets

PHYSICAL BROADCAST CHANNEL FOR CHANNEL CORRECTION

FIELD OF THE DISCLOSURE

Aspects of the present disclosure generally relate to wireless communication and to techniques and apparatuses for using a physical broadcast channel for channel correction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE) or an apparatus of the UE. The method may include receiving a first physical broadcast channel (PBCH) communication on a channel. The method may include decoding the first PBCH communication as a decoded PBCH payload. The method may include reencoding the decoded PBCH payload as a first pilot signal. The method may include receiving a first data communication with first data. The method may include correcting the channel for the first data based on the first pilot signal. The method may include decoding the first data.

Some aspects described herein relate to an apparatus of a UE for wireless communication. The apparatus may include memory, one or more processors coupled to the memory, and instructions stored in the memory and executable by the one or more processors. The instructions may be executable by the one or more processors to cause the UE to receive a first PBCH communication on a channel. The instructions may be executable by the one or more processors to cause the UE to decode the first PBCH communication as a decoded PBCH payload. The instructions may be executable by the one or more processors to cause the UE to reencode the decoded PBCH payload as a first pilot signal. The instructions may be executable by the one or more processors to cause the UE to receive a first data communication with first data. The instructions may be executable by the one or more processors to cause the UE to correct the channel for the first data based on the first pilot signal. The instructions may be executable by the one or more processors to cause the user equipment to decode the first data.

Some aspects described herein relate to a non-transitory computer-readable medium that stores one or more instructions for wireless communication by a UE. The one or more instructions, when executed by one or more processors of the UE, may cause the UE to receive a first PBCH communication on a channel. The one or more instructions, when executed by one or more processors of the UE, may cause the UE to decode the first PBCH communication as a decoded PBCH payload. The one or more instructions, when executed by one or more processors of the UE, may cause the UE to reencode the decoded PBCH payload as a first pilot signal. The one or more instructions, when executed by one or more processors of the UE, may cause the UE to receive a first data communication with first data. The one or more instructions, when executed by one or more processors of the UE, may cause the UE to correct the channel for the first data based on the first pilot signal. The one or more instructions, when executed by one or more processors of the UE, may cause the UE to decode the first data.

Some aspects described herein relate to an apparatus for wireless communication. The apparatus may include means for receiving a first PBCH communication on a channel. The apparatus may include means for decoding the first PBCH communication as a decoded PBCH payload. The apparatus may include means for reencoding the decoded PBCH payload as a first pilot signal. The apparatus may include means for receiving a first data communication with first data. The apparatus may include means for correcting the channel for the first data based on the first pilot signal. The apparatus may include means for decoding the first data.

Aspects generally include a method, apparatus, system, computer program product, non-transitory computer-readable medium, UE, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
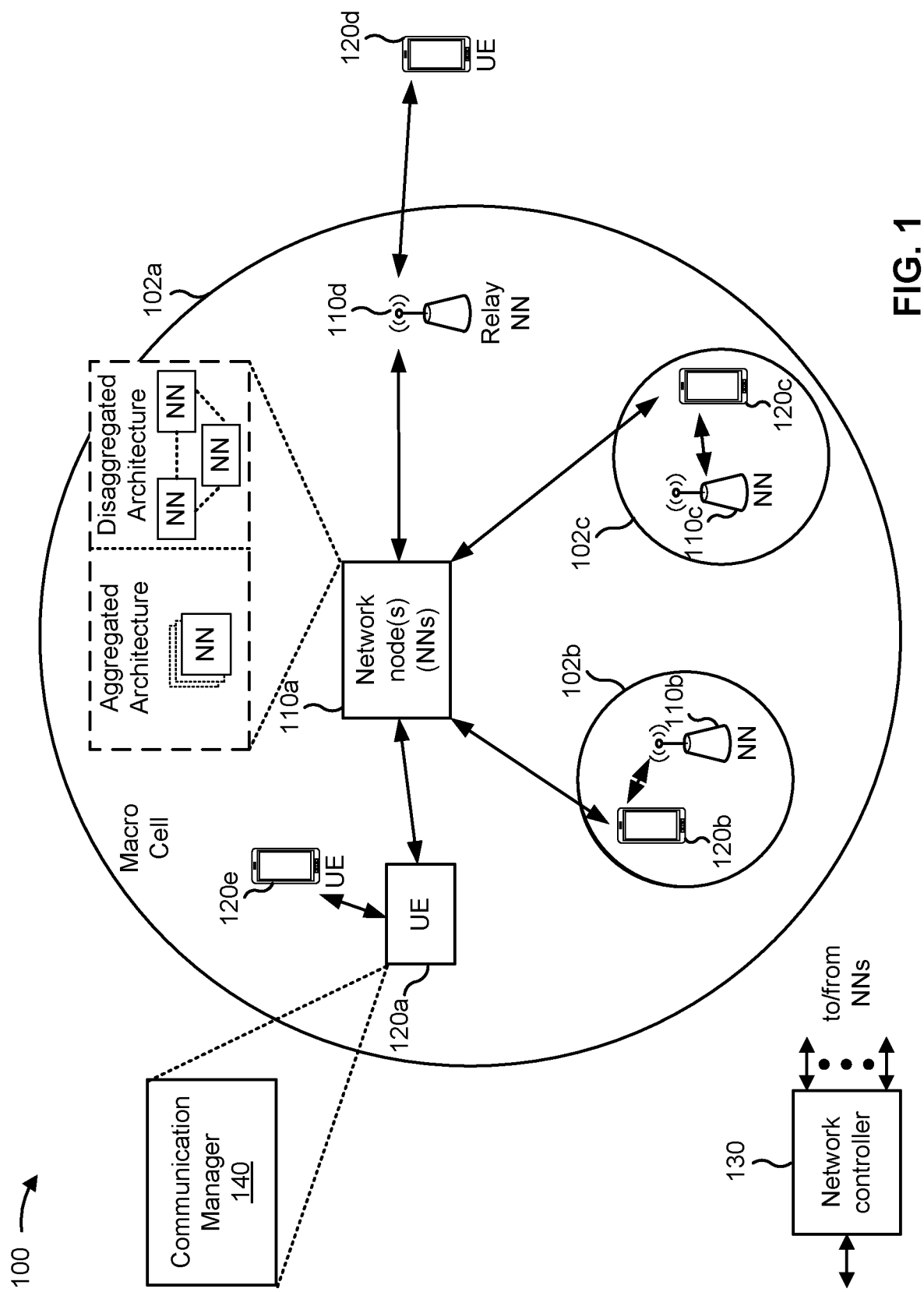
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells.

In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station," "network entity," or "network node" may refer to one or more virtual base stations or one or more virtual base station functions. For example, in some aspects, two or more base station functions may be instantiated on a single device. In some aspects, the term "base station," "network entity," or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a first physical broadcast channel (PBCH) communication on a channel. The communication manager 140 may decode the first PBCH communication as a decoded PBCH payload. The communication manager 140 may reencode the decoded PBCH payload as a first pilot signal. The communication manager 140 may receive a first data communication with first data. The communication manager 140 may correct the channel for the first data based on the first pilot signal. The communication manager 140 may decode the first data. Additionally, or alternatively, the communication manager 140 may perform one or more other operations described herein.

As indicated above, FIG. 1 is provided as an example. Other examples may differ from what is described with regard to FIG. 1.

Figure 2:
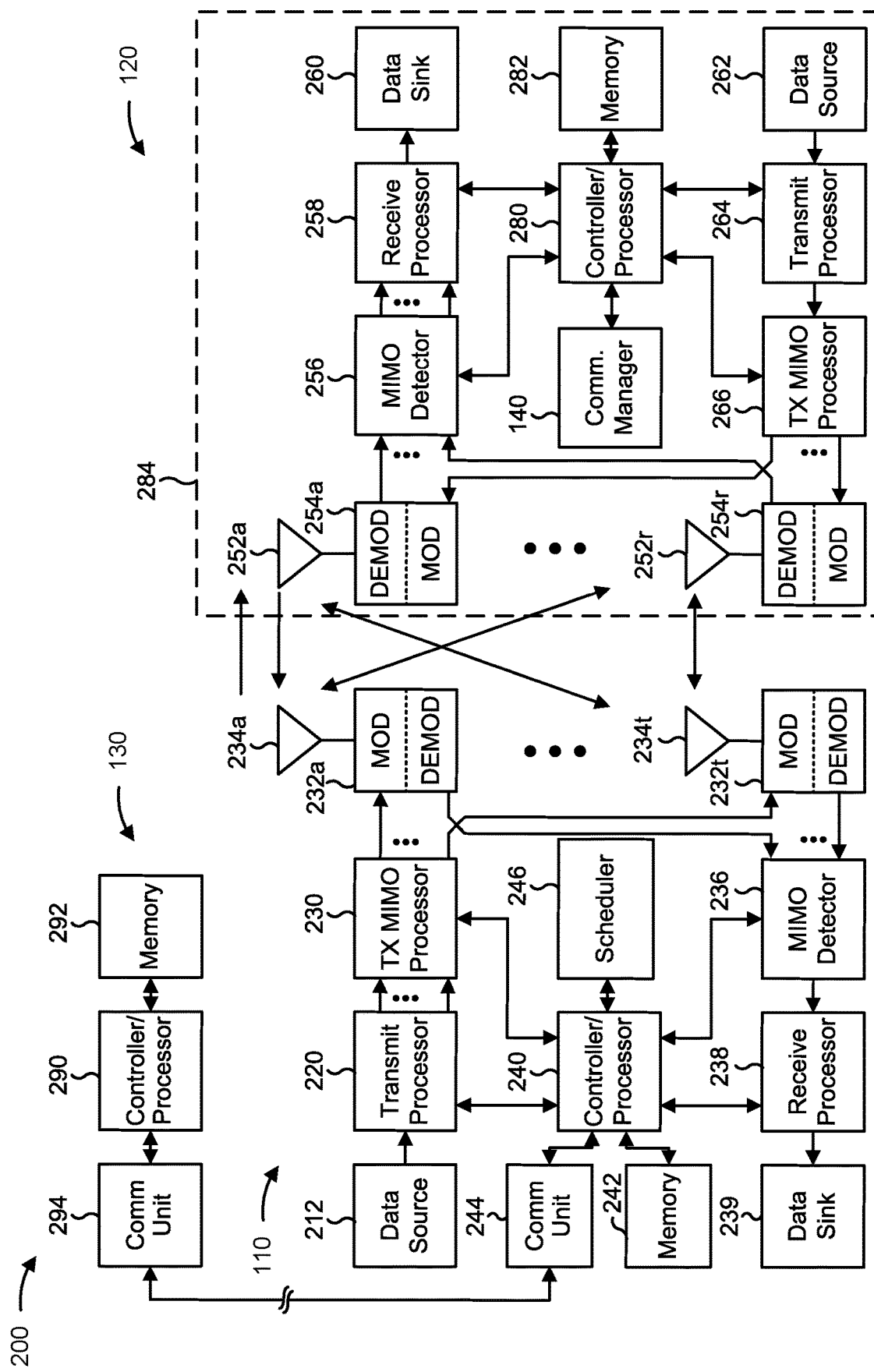
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the network node 110, the controller/processor 280 of the UE 120, and/or any other component(s) of FIG. 2 may perform one or more techniques associated with using a PBCH for channel correction, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving a first PBCH communication on a channel; means for decoding the first PBCH communication as a decoded PBCH payload; means for reencoding the decoded PBCH payload as a first pilot signal; means for receiving a first data communication with first data; means for correcting the channel for the first data based on the first pilot signal; and/or means for decoding the first data. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
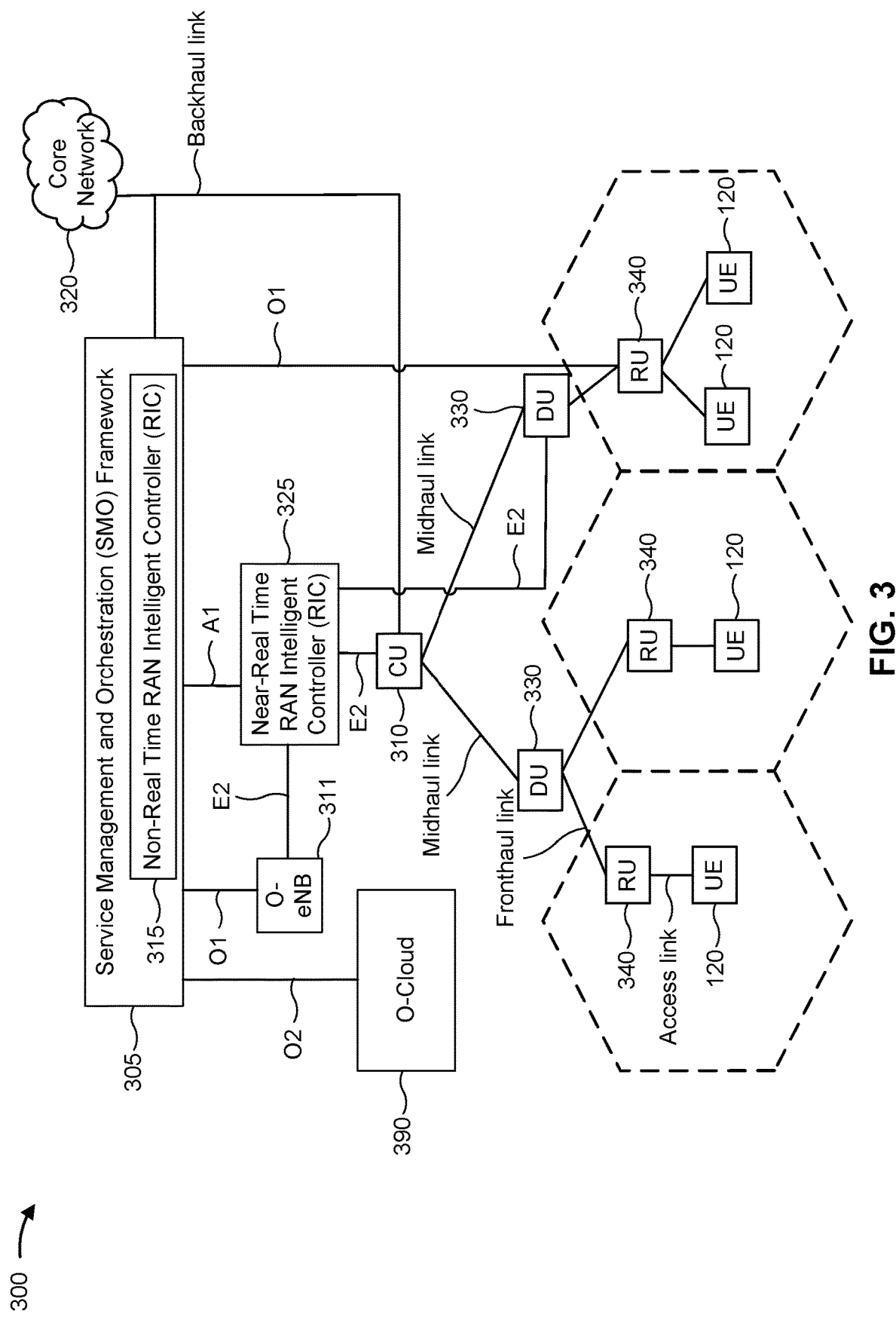
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
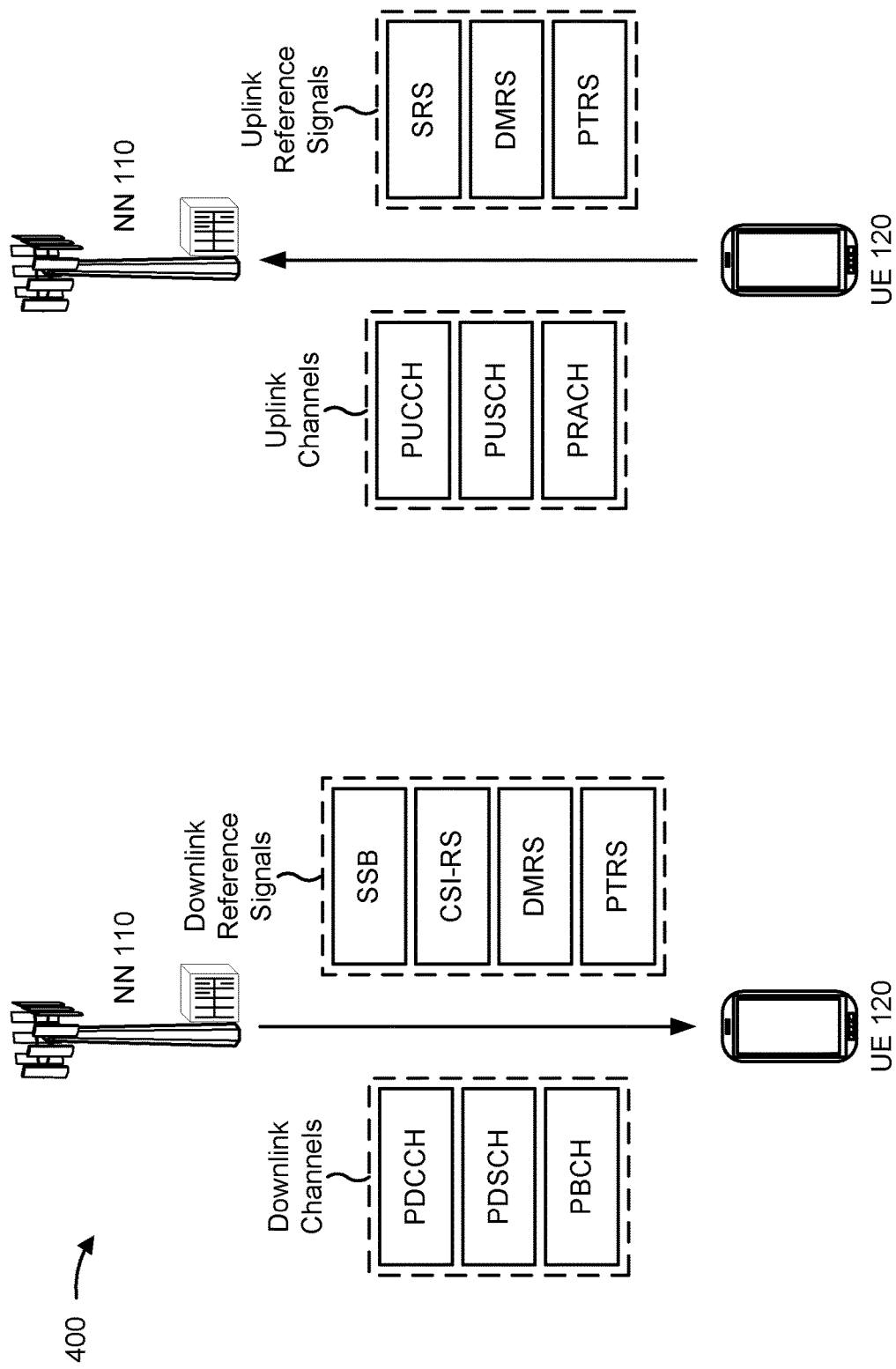
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries downlink control information (DCI), a physical downlink shared channel (PDSCH) that carries downlink data, or a PBCH that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network node 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

Previous network designs (e.g., 3G, LTE) have used frequent common or pilot signals to help with channel correction. Channel correction involves estimating a channel, or changes to the channel, for received communications and correcting the channel based on the channel estimate. Channel correction helps communications to be decoded properly in case there is a shift in time or a frequency phase while traveling on the channel. In an example, LTE uses a CRS or a common reference signal as a pilot signal. The CRS is a frequent (e.g., every 1 millisecond (ms)), full-bandwidth signal that consumes a significant amount of power. 5G NR networks have replaced the CRS with a less frequent tracking reference signal (TRS). The TRS may be every 20-80 ms. However, the time period between TRSs may be too long such that some communications are affected by changes in time or frequency on the channel. There is also less training data for estimating tracking loops and for channel estimation. Without appropriate channel correction, communications may degrade, which increases latency and wastes power, processing resources, and signaling resources.

As indicated above, FIG. 4 is provided as an example. Other examples may differ from what is described with regard to FIG. 4.

Figure 5:
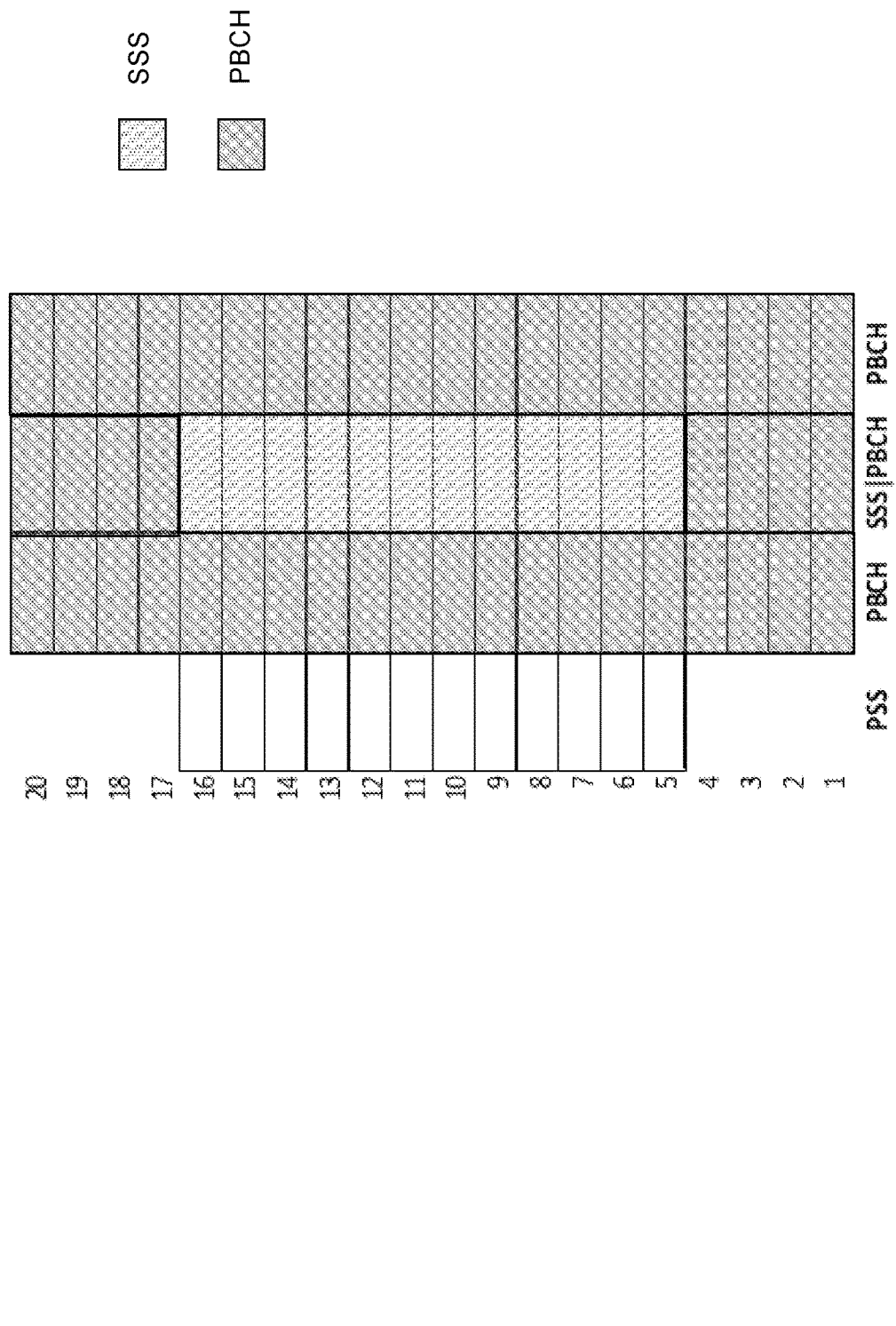
FIG. 5 is a diagram illustrating an example of training data for channel estimation, in accordance with the present disclosure.

FIG. 5 is a diagram illustrating an example 500 of training data for channel estimation, in accordance with the present disclosure.

According to various aspects described herein, a UE may decode a PBCH communication to obtain a decoded PBCH payload. The UE may then reencode the decoded PBCH payload to serve as a pilot signal. The pilot signal may be used for channel estimation and correction. Because PBCH communications arrive every 5-20 ms (as compared to 20-80 ms for a TRS), pilot signals from PBCH communications may provide more frequent opportunities for channel estimation. The PBCH may also provide more training data for channel estimation. For example, instead of using only the DMRS in the PBCH, additional PBCH data may be added to the training data. Example 500 shows resource elements (REs) in one symbol and 12 tones for an SSS signal currently used for loop or channel estimation. However, example 500 also shows a greater quantity of REs for a PBCH that may be used as additional training data for channel estimation. More training data (e.g., multiple of 4 or 5) results in a more accurate channel estimation and a greater processing gain (e.g., 6 dB).

As indicated above, FIG. 5 is provided as an example. Other examples may differ from what is described with regard to FIG. 5.

Figure 6:
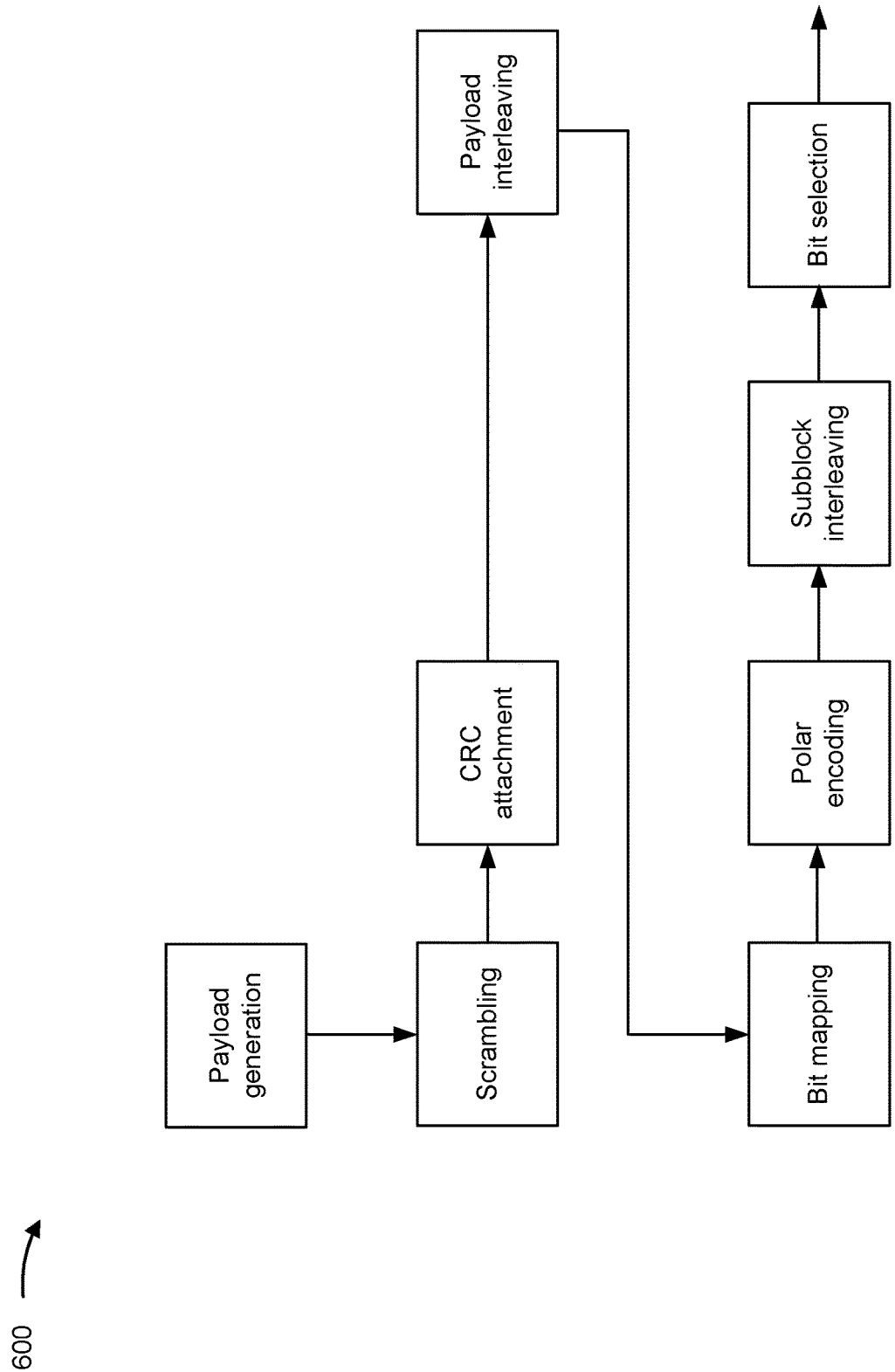
FIG. 6 is a diagram illustrating an example of encoding, in accordance with the present disclosure.

FIG. 6 is a diagram illustrating an example 600 of encoding, in accordance with the present disclosure.

Example 600 shows an existing process of encoding as described in 3GPP Technical Specification (TS) 38.212. Such a process may be used to encode a PBCH payload to obtain a PBCH communication or to encode data to obtain a data communication. Once a payload is generated, the payload may be scrambled and a cyclic redundancy check (CRC) may be attached for reliability checking. The process may continue with payload interleaving to rearrange the data according to a defined pattern, before bit mapping. The process may continue with polar encoding, which transforms the data through reproduction and combination into a larger amount of data for redundancy and reliability. The process further continues with subblock interleaving and bit selection.

Another process may be used to decode the PBCH communication to obtain a PBCH payload. This may involve a decoding process that reverses the encoding process.

As indicated above, FIG. 6 is provided as an example. Other examples may differ from what is described with regard to FIG. 6.

Figure 7:
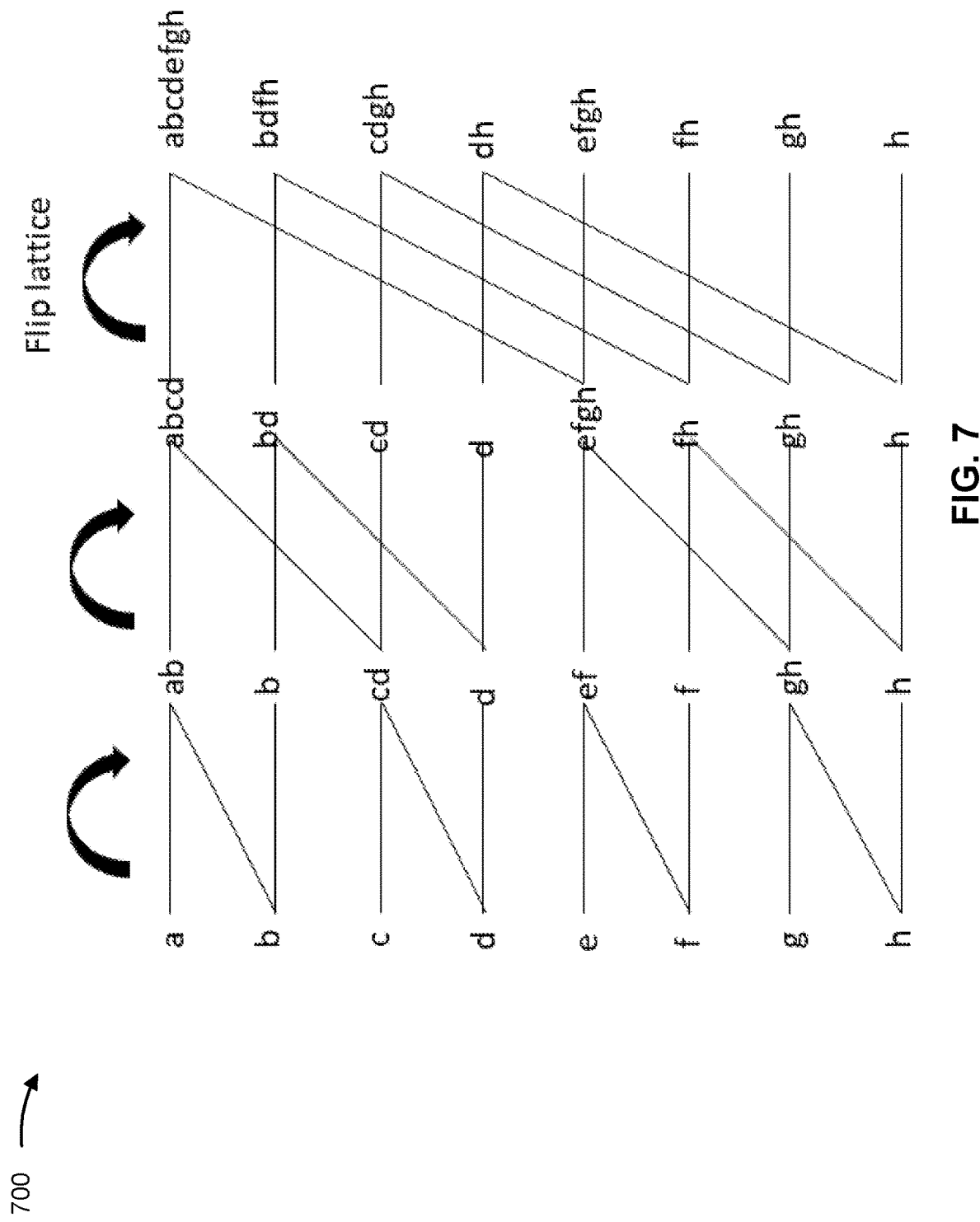
FIG. 7 is a diagram illustrating an example of a polar encoding butterfly lattice, in accordance with the present disclosure.

FIG. 7 is a diagram illustrating an example 700 of a polar encoding butterfly lattice, in accordance with the present disclosure.

Polar encoding may use a defined butterfly lattice, which is a defined pattern for increasing the redundancy and reliability of data. In example 700, a letter represents a portion of data. Portions of data may be duplicated and/or combined with other portions of data for redundancy (e.g., using XOR or deal operations). For example, in a first stage (first column), data portion "a" may be combined with data portion "b." Combined data portion "ab" may be combined with combined data portion "cd." Combined data portion "abcd" may be combined with combined data portion "efgh" to form combined data portion "abcdefgh." In some aspects, the UE may encode a decoded PBCH payload based at least in part on per-stage instructions for a butterfly lattice that is used for polar encoding.

As indicated above, FIG. 7 is provided as an example. Other examples may differ from what is described with regard to FIG. 7.

Figure 8:
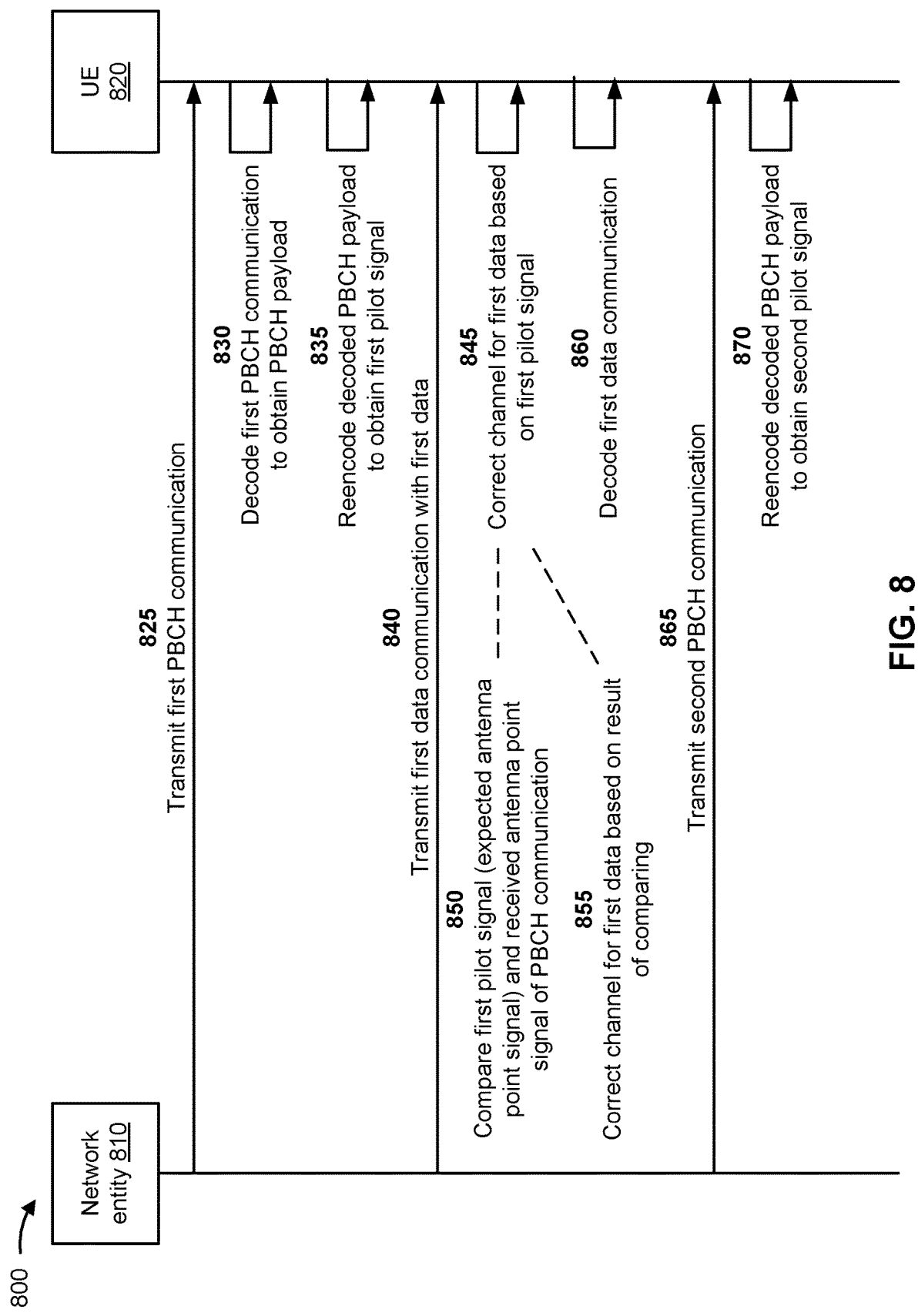
FIG. 8 is a diagram illustrating an example associated with reencoding a physical broadcast channel payload as a pilot signal, in accordance with the present disclosure.

FIG. 8 is a diagram illustrating an example 800 associated with reencoding a PBCH payload as a pilot signal, in accordance with the present disclosure. As shown in FIG. 8, a network entity 810 (e.g., network node 110) and a UE 820 (e.g., UE 120) may communicate with one another via a wireless network (e.g., wireless network 100).

As shown by reference number 825, the network entity 810 may transmit a first PBCH communication on a channel. As shown by reference number 830, the UE 820 may decode the first PBCH communication to obtain a decoded PBCH payload. As shown by reference number 835, the UE 820 may reencode the decoded PBCH payload to obtain a first pilot signal. The reencoding may use an encoding process, such as the encoding process described in connection with FIGS. 6 and 7. In some aspects, reencoding may occur if the first PBCH communication is successfully decoded. If the decoding of the first PBCH communication is not successful, the UE 820 may not reencode the decoded PBCH payload.

As shown by reference number 840, the network entity 810 may transmit a first data communication with first data on the channel. As shown by reference number 845, the UE 820 may correct the channel for the first data based on the first pilot signal. Correcting the channel may involve obtaining a channel estimate based on comparing a received antenna point signal of the first PBCH communication and the first pilot signal (an expected antenna point signal), as shown by reference number 850. The received antenna point signal may be a signal as received at the antenna, before decoding. The expected antenna point signal may be the signal at the antenna after reencoding. The comparing may result in a difference between the received antenna point signal and the expected antenna point signal. The difference may be in time (e.g., 1 or 2 symbols) and/or frequency (e.g., phase shift). As shown by reference number 855, the UE 820 may correct the channel for the first data based on this difference, which may include a channel estimate that is enhanced with respect to previous channel estimation techniques. For example, the difference in time or frequency (or channel estimate) may be added to or subtracted from the received antenna point signal of the first data communication before decoding the first data communication, as shown by reference number 860, to obtain decoded first data.

In some aspects, the UE 820 may perform other actions with the channel estimate that is associated with reencoding the decoded PBCH payload. For example, the UE 820 may perform beam selection, RSRP estimation, delay bin estimation, Doppler estimation, and/or time to live (TTL) estimation.

In some aspects, the same decoded PBCH payload from the first PBCH communication may be used for subsequent PBCH communication reencoding. For example, as shown by reference number 865, the network entity 810 may transmit a second PBCH communication. Rather than consuming time and processing resources decoding the second PBCH communication, the UE 820 may reencode the decoded PBCH payload (from the first PBCH communication) to obtain a second pilot signal, as shown by reference number 870, to be used for channel correction of subsequent data communications. Note that the reencoding of the decoded PBCH payload for the second pilot signal may involve a change in frame number or scrambling from when the first PBCH communication. The antenna point signal of the first pilot signal and the antenna point signal of the second pilot signal are expected to be different. The UE 820 may receive a second data communication and correct the channel for the second data communication based on the second pilot signal, using a similar process as shown by reference numbers 850 and 855.

The PBCH payload is not expected to change frequently. However, the PBCH payload may change occasionally (e.g., every 100 PBCH communications). In some aspects, the second PBCH communication may be decoded to obtain a new decoded PBCH payload if there is a sufficient change in the PBCH communication signal. For example, the UE 820 may decode the second PBCH communication to obtain a new decoded PBCH payload based on a difference between a DMRS signal-to-noise ratio (SNR) and a PBCH SNR. For example, if the difference (e.g., in dBm) satisfies a threshold (e.g., greater than 5 dB), the UE 820 may reencode the decoded PBCH payload. If the difference does not satisfy the threshold (e.g., less than 5 dB), the UE 820 may not reencode the decoded PBCH payload.

A PBCH payload may include two parts, dynamic bits (e.g., system frame number (SFN), half frame number, SSB identifier (ID)) and semi-static bits (rest of the bits). The dynamic bits can change from one SSB occasion to another. However, the UE 820 can predict these bits at any desired SSB occasion. Any other change in these bits can occur at a known modification boundary and may be indicated by the network entity 810 through a short message. There is not a reason for frequent PBCH decoding. That is, the UE 820 may be able to determine if a change in the PBCH communication is expected to result in decoding a new PBCH payload.

By reencoding a PBCH payload as a pilot signal, channel estimation may be improved without the need for a power consuming, frequent, wide-band pilot signal. As a result, the network entity 810 and the UE 820 conserve power and signaling resources.

In some aspects, the UE 820 may use other communications to increase a frequency of a pilot signal or to add more training data for channel estimation. For example, the UE 820 may decode a data communication to obtain decoded first data and the UE 820 may reencode the data communication as a pilot signal for channel correction of subsequent data communications. This may involve data that is more consistent for use as pilot signals. In some aspects, the UE 820 may decode control information or control channel communications and use decoded control information as a pilot signal for channel correction of subsequent communications. This may involve control information that is more consistent for use as pilot signals.

As indicated above, FIG. 8 is provided as an example. Other examples may differ from what is described with respect to FIG. 8.

Figure 9:
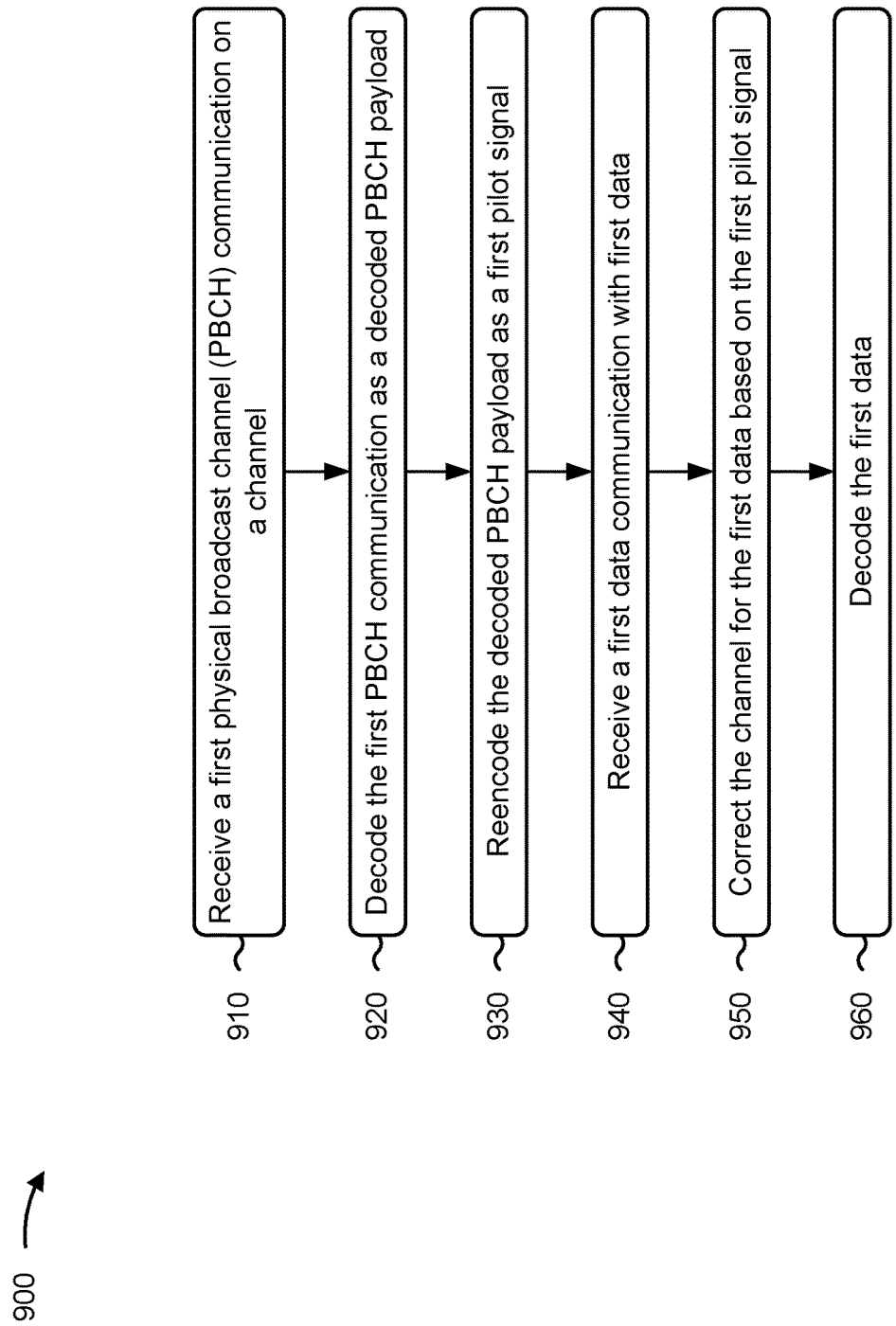
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120, UE 820) performs operations associated with using a PBCH for channel correction.

As shown in FIG. 9, in some aspects, process 900 may include receiving a first PBCH communication on a channel (block 910). For example, the UE (e.g., using communication manager 1008 and/or reception component 1002 depicted in FIG. 10) may receive a first PBCH communication on a channel, as described above.

As further shown in FIG. 9, in some aspects, process 900 may include decoding the first PBCH communication as a decoded PBCH payload (block 920). For example, the UE (e.g., using communication manager 1008 and/or decoding component 1010 depicted in FIG. 10) may decode the first PBCH communication as a decoded PBCH payload, as described above.

As further shown in FIG. 9, in some aspects, process 900 may include reencoding the decoded PBCH payload as a first pilot signal (block 930). For example, the UE (e.g., using communication manager 1008 and/or encoding component 1012 depicted in FIG. 10) may reencode the decoded PBCH payload as a first pilot signal, as described above.

As further shown in FIG. 9, in some aspects, process 900 may include receiving a first data communication with first data (block 940). For example, the UE (e.g., using communication manager 1008 and/or reception component 1002 depicted in FIG. 10) may receive a first data communication with first data, as described above.

As further shown in FIG. 9, in some aspects, process 900 may include correcting the channel for the first data based on the first pilot signal (block 950). For example, the UE (e.g., using communication manager 140 and/or channel correction component 1014 depicted in FIG. 10) may correct the channel for the first data based on the first pilot signal, as described above.

As further shown in FIG. 9, in some aspects, process 900 may include decoding the first data (block 960). For example, the UE (e.g., using communication manager 1008 and/or decoding component 1010 depicted in FIG. 10) may decode the first data, as described above.

Process 900 may include additional aspects, such as any single aspect or any combination of aspects described below and/or in connection with one or more other processes described elsewhere herein.

In a first aspect, the first pilot signal is an expected antenna point signal, and correcting the channel for the first data includes comparing the expected antenna point signal and a received antenna point signal of the first PBCH communication, obtaining an estimate of the channel based on a result of the comparing, and correcting the channel for the first data based on the estimate of the channel.

In a second aspect, alone or in combination with the first aspect, process 900 includes performing beam selection based at least in part on the estimate of the channel.

In a third aspect, alone or in combination with one or more of the first and second aspects, the reencoding the decoded PBCH payload includes reencoding the decoded PBCH payload based on the decoding of the first PBCH communication being successful.

In a fourth aspect, alone or in combination with one or more of the first through third aspects, process 900 includes receiving a second PBCH communication on the channel, reencoding the decoded PBCH payload as a second pilot signal, receiving a second data communication with second data on the channel, correcting the channel for the second data based on the second pilot signal, and decoding the second data.

In a fifth aspect, alone or in combination with one or more of the first through fourth aspects, the second pilot signal is an expected antenna point signal, and correcting the channel for the second data includes comparing the expected antenna point signal and a received antenna point signal of the second PBCH communication, obtaining an estimate of the channel based on a result of the comparing, and correcting the channel for the second data based on the estimate of the channel.

In a sixth aspect, alone or in combination with one or more of the first through fifth aspects, process 900 includes decoding a second PBCH communication to obtain a new decoded PBCH payload based on a difference between a DMRS SNR of the second PBCH communication and a PBCH SNR of the second PBCH communication satisfying a difference threshold.

In a seventh aspect, alone or in combination with one or more of the first through sixth aspects, the reencoding the decoded PBCH payload includes polar encoding the decoded PBCH payload based at least in part on per-stage instructions for a butterfly lattice used for the polar encoding.

In an eighth aspect, alone or in combination with one or more of the first through seventh aspects, process 900 includes receiving a second data communication with second data on the channel, correcting the channel for the second data based on the first pilot signal, and decoding the second data.

In a ninth aspect, alone or in combination with one or more of the first through eighth aspects, the decoding the first data includes decoding the first data to obtain decoded first data, and process 900 includes reencoding the decoded first data as a second pilot signal, receiving a second data communication with second data on the channel, correcting the channel for the second data based on the second pilot signal, and decoding the second data.

In a tenth aspect, alone or in combination with one or more of the first through ninth aspects, process 900 includes receiving a first control communication with control information on the channel, decoding the control information to obtain decoded control information, reencoding the decoded control information as a second pilot signal, receiving a second data communication with second data on the channel, correcting the channel for the second data based on the second pilot signal, and decoding the second data.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
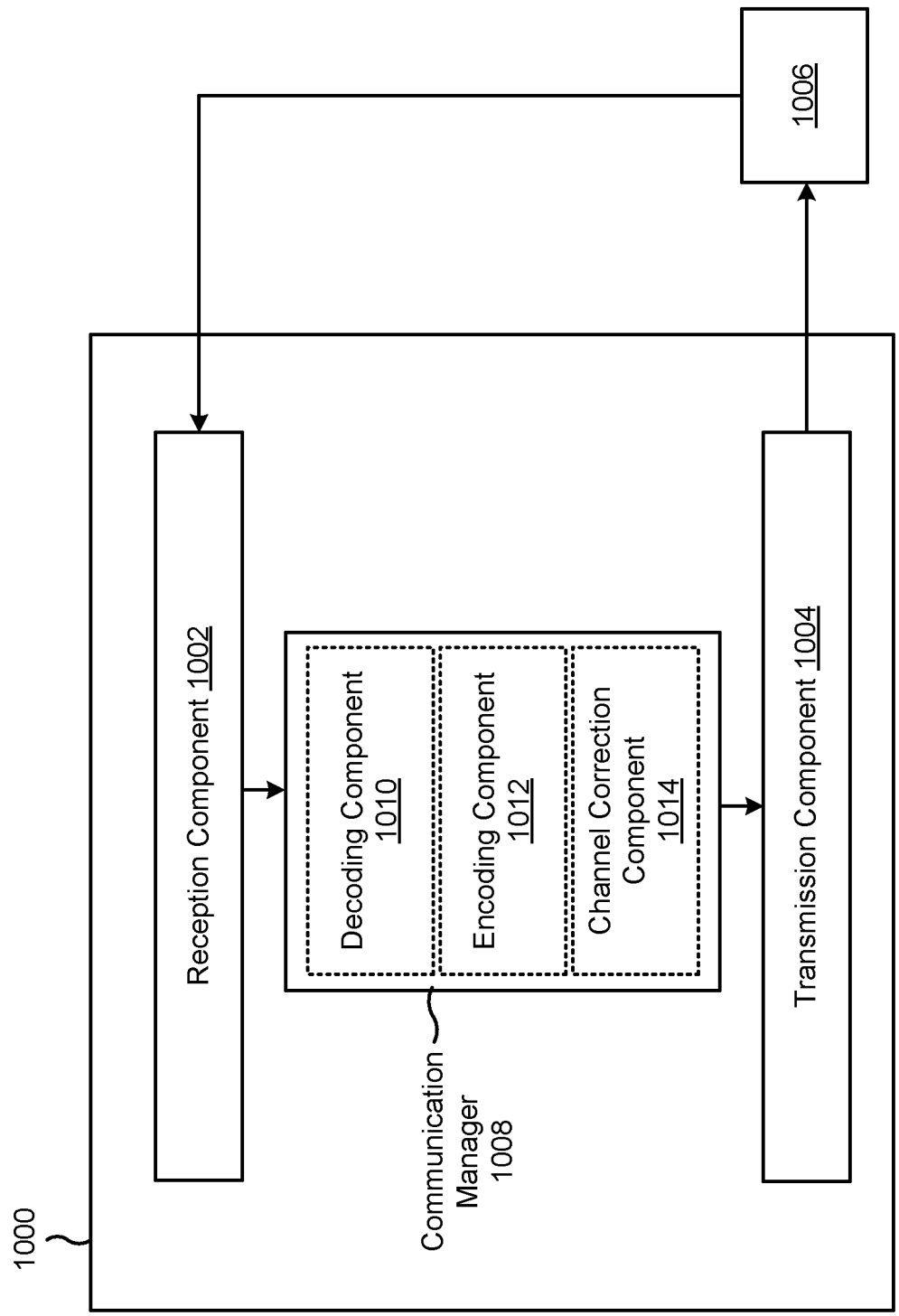
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE (e.g., UE 120, UE 820), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008. The communication manager 1008 may control and/or otherwise manage one or more operations of the reception component 1002 and/or the transmission component 1004. In some aspects, the communication manager 1008 may include one or more antennas, a modem, a controller/processor, a memory, or a combination thereof, of the UE described in connection with FIG. 2. The communication manager 1008 may be, or be similar to, the communication manager 140 depicted in FIGS. 1 and 2. For example, in some aspects, the communication manager 1008 may be configured to perform one or more of the functions described as being performed by the communication manager 140. In some aspects, the communication manager 1008 may include the reception component 1002 and/or the transmission component 1004. The communication manager 1008 may include one or more of a decoding component 1010, an encoding component 1012, and/or a channel correction component 1014, among other examples.

In some aspects, the apparatus 1000 may be configured to perform one or more operations described herein in connection with FIGS. 1-8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive a first PBCH communication on a channel. The decoding component 1010 may decode the first PBCH communication as a decoded PBCH payload. The encoding component 1012 may reencode the decoded PBCH payload as a first pilot signal. The reception component 1002 may receive a first data communication with first data. The channel correction component 1014 may correct the channel for the first data based on the first pilot signal. The decoding component 1010 may decode the first data.

The channel correction component 1014 may perform beam selection or RSRP estimation based at least in part on the estimate of the channel. The reception component 1002 may receive a second PBCH communication on the channel. The encoding component 1012 may reencode the decoded PBCH payload as a second pilot signal.

The reception component 1002 may receive a second data communication with second data on the channel. The channel correction component 1014 may correct the channel for the second data based on the second pilot signal. The decoding component 1010 may decode the second data.

The decoding component 1010 may decode a second PBCH communication to obtain a new decoded PBCH payload based on a difference between a DMRS SNR of the second PBCH communication and a PBCH SNR of the second PBCH communication satisfying a difference threshold.

The reception component 1002 may receive a second data communication with second data on the channel. The channel correction component 1014 may correct the channel for the second data based on the first pilot signal. The decoding component 1010 may decode the second data.

The reception component 1002 may receive a first control communication with control information on the channel. The decoding component 1010 may decode the control information to obtain decoded control information. The reception component 1002 may receive a second data communication with second data on the channel. The channel correction component 1014 may correct the channel for the second data based on the second pilot signal. The decoding component 1010 may decode the second data.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by an apparatus of a user equipment (UE), comprising: receiving a first physical broadcast channel (PBCH) communication on a channel; decoding the first PBCH communication as a decoded PBCH payload; reencoding the decoded PBCH payload as a first pilot signal; receiving a first data communication with first data; correcting the channel for the first data based on the first pilot signal; and decoding the first data.

Aspect 2: The method of Aspect 1, wherein the first pilot signal is an expected antenna point signal, and wherein correcting the channel for the first data includes: comparing the expected antenna point signal and a received antenna point signal of the first PBCH communication; obtaining an estimate of the channel based on a result of the comparing; and correcting the channel for the first data based on the estimate of the channel.

Aspect 3: The method of Aspect 2, further comprising performing beam selection based at least in part on the estimate of the channel.

Aspect 4: The method of any of Aspects 1-3, wherein the reencoding the decoded PBCH payload includes reencoding the decoded PBCH payload based on the decoding of the first PBCH communication being successful.

Aspect 5: The method of any of Aspects 1-4, further comprising: receiving a second PBCH communication on the channel; reencoding the decoded PBCH payload as a second pilot signal; receiving a second data communication with second data on the channel; correcting the channel for the second data based on the second pilot signal; and decoding the second data.

Aspect 6: The method of Aspect 5, wherein the second pilot signal is an expected antenna point signal, and wherein correcting the channel for the second data includes: comparing the expected antenna point signal and a received antenna point signal of the second PBCH communication; obtaining an estimate of the channel based on a result of the comparing; and correcting the channel for the second data based on the estimate of the channel.

Aspect 7: The method of any of Aspects 1-6, further comprising decoding a second PBCH communication to obtain a new decoded PBCH payload based on a difference between a demodulation reference signal signal-to-noise ratio (SNR) of the second PBCH communication and a PBCH SNR of the second PBCH communication satisfying a difference threshold.

Aspect 8: The method of any of Aspects 1-7, wherein the reencoding the decoded PBCH payload includes polar encoding the decoded PBCH payload based at least in part on per-stage instructions for a butterfly lattice used for the polar encoding.

Aspect 9: The method of any of Aspects 1-8, further comprising: receiving a second data communication with second data on the channel; correcting the channel for the second data based on the first pilot signal; and decoding the second data.

Aspect 10: The method of any of Aspects 1-9, wherein the decoding the first data includes decoding the first data to obtain decoded first data, and wherein the method further comprises: reencoding the decoded first data as a second pilot signal; receiving a second data communication with second data on the channel; correcting the channel for the second data based on the second pilot signal; and decoding the second data.

Aspect 11: The method of any of Aspects 1-10, further comprising: receiving a first control communication with control information on the channel; decoding the control information to obtain decoded control information; reencoding the decoded control information as a second pilot signal; receiving a second data communication with second data on the channel; correcting the channel for the second data based on the second pilot signal; and decoding the second data.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by an apparatus of a user equipment (UE), comprising:
   receiving a first physical broadcast channel (PBCH) communication, carrying system information, on a channel;
   decoding the first PBCH communication as a decoded PBCH payload;
   reencoding the decoded PBCH payload as a first pilot signal used for channel estimation;
   receiving, on the channel, a first data communication with first data;
   correcting the channel for the first data based on the first pilot signal; and
   decoding the first data.

2. The method of claim 1, wherein the first pilot signal is an expected antenna point signal, and wherein correcting the channel for the first data includes:
   comparing the expected antenna point signal and a received antenna point signal of the first PBCH communication;
   obtaining an estimate of the channel based on a result of the comparing; and
   correcting the channel for the first data based on the estimate of the channel.

3. The method of claim 2, further comprising performing beam selection based at least in part on the estimate of the channel.

4. The method of claim 1, wherein the reencoding the decoded PBCH payload includes reencoding the decoded PBCH payload based on the decoding of the first PBCH communication being successful.

5. The method of claim 1, further comprising:
   receiving a second PBCH communication on the channel;
   reencoding the decoded PBCH payload as a second pilot signal;
   receiving a second data communication with second data on the channel;
   correcting the channel for the second data based on the second pilot signal; and
   decoding the second data.

6. The method of claim 5, wherein the second pilot signal is an expected antenna point signal, and wherein correcting the channel for the second data includes:
   comparing the expected antenna point signal and a received antenna point signal of the second PBCH communication;
   obtaining an estimate of the channel based on a result of the comparing; and
   correcting the channel for the second data based on the estimate of the channel.

7. The method of claim 1, further comprising decoding a second PBCH communication to obtain a new decoded PBCH payload based on a difference between a demodulation reference signal signal-to-noise ratio (SNR) of the second PBCH communication and a PBCH SNR of the second PBCH communication satisfying a difference threshold.

8. The method of claim 1, wherein the reencoding the decoded PBCH payload includes polar encoding the decoded PBCH payload based at least in part on per-stage instructions for a butterfly lattice used for the polar encoding.

9. The method of claim 1, further comprising:
   receiving a second data communication with second data on the channel;
   correcting the channel for the second data based on the first pilot signal; and
   decoding the second data.

10. The method of claim 1, wherein the decoding the first data includes decoding the first data to obtain decoded first data, and wherein the method further comprises:
   reencoding the decoded first data as a second pilot signal;
   receiving a second data communication with second data on the channel;
   correcting the channel for the second data based on the second pilot signal; and
   decoding the second data.

11. The method of claim 1, further comprising:
   receiving a first control communication with control information on the channel;
   decoding the control information to obtain decoded control information;
   reencoding the decoded control information as a second pilot signal;
   receiving a second data communication with second data on the channel;
   correcting the channel for the second data based on the second pilot signal; and
   decoding the second data.

12. An apparatus of a user equipment (UE) for wireless communication, comprising:
   memory; and
   one or more processors coupled to the memory, the memory comprising instructions executable by the one or more processors to cause the UE to:
      receive a first physical broadcast channel (PBCH) communication, carrying system information, on a channel;
      decode the first PBCH communication as a decoded PBCH payload;
      reencode the decoded PBCH payload as a first pilot signal used for channel estimation;
      receive, on the channel, a first data communication with first data;
      correct the channel for the first data based on the first pilot signal; and
      decode the first data.

13. The apparatus of claim 12, wherein the first pilot signal is an expected antenna point signal, and wherein the instructions, when correcting the channel for the first data, are further executable by the one or more processors to cause the UE to:
   compare the expected antenna point signal and a received antenna point signal of the first PBCH communication;
   obtain an estimate of the channel based on a result of the comparing; and
   correct the channel for the first data based on the estimate of the channel.

14. The apparatus of claim 13, wherein the memory further comprises instructions executable by the one or more processors to cause the UE to perform reference signal received power estimation based at least in part on the estimate of the channel.

15. The apparatus of claim 12, wherein the instructions, when reencoding the decoded PBCH payload, are further executable by the one or more processors to cause the UE to reencode the decoded PBCH payload based on the decoding of the first PBCH communication being successful.

16. The apparatus of claim 12, wherein the memory further comprises instructions executable by the one or more processors to cause the UE to:
   receive a second PBCH communication on the channel;
   reencode the decoded PBCH payload as a second pilot signal;
   receive a second data communication with second data on the channel;
   correct the channel for the second data based on the second pilot signal; and
   decode the second data.

17. The apparatus of claim 16, wherein the second pilot signal is an expected antenna point signal, and wherein the instructions, when correcting the channel for the second data, are further executable by the one or more processors to cause the UE to:
   compare the expected antenna point signal and a received antenna point signal of the second PBCH communication;
   obtain an estimate of the channel based on a result of the comparing; and
   correct the channel for the second data based on the estimate of the channel.

18. The apparatus of claim 12, the memory further comprises instructions executable by the one or more processors to cause the UE to decode a second PBCH communication to obtain a new decoded PBCH payload based on a difference between a demodulation reference signal signal-to-noise ratio (SNR) of the second PBCH communication and a PBCH SNR of the second PBCH communication satisfying a difference threshold.

19. The apparatus of claim 12, wherein the instructions, when reencoding the first PBCH communication, are further executable by the one or more processors to polar encode the decoded PBCH payload based at least in part on per-stage instructions for a butterfly lattice used for the polar encoding.

20. The apparatus of claim 12, wherein the memory further comprises instructions executable by the one or more processors to cause the UE to:
   receive a second data communication with second data on the channel;
   correct the channel for the second data based on the first pilot signal; and
   decode the second data.

21. The apparatus of claim 12, wherein the instructions, when decoding the first data, are further executable by the one or more processors to decode the first data to obtain decoded first data, and wherein the memory further comprises instructions executable by the one or more processors to cause the UE to:
   reencode the decoded first data as a second pilot signal;
   receive a second data communication with second data on the channel;
   correct the channel for the second data based on the second pilot signal; and
   decode the second data.

22. The apparatus of claim 12, wherein the memory further comprises instructions executable by the one or more processors to cause the UE to:
   receive a first control communication with control information on the channel;
   decode the control information to obtain decoded control information;
   reencode the decoded control information as a second pilot signal;
   receive a second data communication with second data on the channel;
   correct the channel for the second data based on the second pilot signal; and
   decode the second data.

23. A non-transitory computer-readable medium storing one or more instructions for wireless communication, the one or more instructions, when executed by one or more processors of a user equipment (UE), cause the UE to:
- receive a first physical broadcast channel (PBCH) communication, carrying system information, on a channel;
- decode the first PBCH communication as a decoded PBCH payload;
- reencode the decoded PBCH payload as a first pilot signal used for channel estimation;
- receive, on the channel, a first data communication with first data;
- correct the channel for the first data based on the first pilot signal; and
- decode the first data.

24. The non-transitory computer-readable medium of claim 23, wherein the first pilot signal is an expected antenna point signal, and wherein the one or more instructions, when correcting the channel for the first data, further cause the UE to:
- compare the expected antenna point signal and a received antenna point signal of the first PBCH communication;
- obtain an estimate of the channel based on a result of the comparing; and
- correct the channel for the first data based on the estimate of the channel.

25. The non-transitory computer-readable medium of claim 23, wherein the one or more instructions further cause the UE to:
- receive a second PBCH communication on the channel;
- reencode the decoded PBCH payload as a second pilot signal;
- receive a second data communication with second data on the channel;
- correct the channel for the second data based on the second pilot signal; and
- decode the second data.

26. The non-transitory computer-readable medium of claim 23, wherein the one or more instructions further cause the UE to:
- receive a second data communication with second data on the channel;
- correct the channel for the second data based on the first pilot signal; and
- decode the second data.

27. An apparatus for wireless communication, comprising:
- means for receiving a first physical broadcast channel (PBCH) communication, carrying system information, on a channel;
- means for decoding the first PBCH communication as a decoded PBCH payload;
- means for reencoding the decoded PBCH payload as a first pilot signal used for channel estimation;
- means for receiving, on the channel, a first data communication with first data;
- means for correcting the channel for the first data based on the first pilot signal; and
- means for decoding the first data.

28. The apparatus of claim 27, wherein the first pilot signal is an expected antenna point signal, and wherein the means for correcting the channel for the first data includes:
- means for comparing the expected antenna point signal and a received antenna point signal of the first PBCH communication;
- means for obtaining an estimate of the channel based on a result of the comparing; and
- means for correcting the channel for the first data based on the estimate of the channel.

29. The apparatus of claim 27, further comprising:
- means for receiving a second PBCH communication on the channel;
- means for reencoding the decoded PBCH payload as a second pilot signal;
- means for receiving a second data communication with second data on the channel;
- means for correcting the channel for the second data based on the second pilot signal; and
- means for decoding the second data.

30. The apparatus of claim 27, further comprising:
- means for receiving a second data communication with second data on the channel;
- means for correcting the channel for the second data based on the first pilot signal; and
- means for decoding the second data.

* * * * *